United States Patent [19]

Rattunde

[11] 4,229,988
[45] Oct. 28, 1980

[54] CONTINUOUSLY VARIABLE CONE PULLEY BELT-DRIVE GEARING

[75] Inventor: Manfred Rattunde, Bad Homburg, Fed. Rep. of Germany

[73] Assignee: P.I.V. Antrieb Reimers Kommanditgesellschaft, Fed. Rep. of Germany

[21] Appl. No.: 948,472

[22] Filed: Oct. 4, 1978

[30] Foreign Application Priority Data

Oct. 6, 1977 [DE] Fed. Rep. of Germany ....... 2744947

[51] Int. Cl.² ........................................... F16H 55/52
[52] U.S. Cl. ................................................. 474/28
[58] Field of Search ............... 74/230.17 F, 230.17 D, 74/230.17 R, 230.17 A

[56] References Cited

U.S. PATENT DOCUMENTS

| | | | |
|---|---|---|---|
| 2,256,114 | 9/1941 | Heyer | 74/230.17 A |
| 3,014,378 | 12/1961 | Bruet | 74/230.17 F |
| 3,081,642 | 3/1963 | Emerson | 74/230.17 F |
| 3,102,431 | 9/1963 | Maurer | 74/230.17 M |
| 3,600,961 | 8/1971 | Rattunde | 74/230.17 F |
| 3,704,634 | 12/1972 | Schrodt | 74/230.17 F |
| 3,782,213 | 1/1974 | Rattunde | 74/230.17 F |
| 3,893,343 | 7/1975 | Zaiser et al. | 74/230.17 F |
| 3,893,344 | 7/1975 | Dantlgraber | 74/230.17 F |
| 3,918,312 | 11/1975 | Espenschied et al. | 74/230.17 F |
| 4,023,425 | 5/1977 | Parker | 74/230.17 F |
| 4,024,772 | 5/1977 | Kumm | 74/230.17 F |
| 4,056,015 | 11/1977 | Ludoph et al. | 74/230.17 F |
| 4,094,203 | 6/1978 | van Deursen | 74/230.17 F |
| 4,116,080 | 9/1978 | Berens | 74/230.17 M |
| 4,143,558 | 3/1979 | van Deursen | 74/230.17 F |

FOREIGN PATENT DOCUMENTS

| | | | |
|---|---|---|---|
| 1210648 | 2/1966 | Fed. Rep. of Germany | 74/230.17 F |
| 1256023 | 12/1967 | Fed. Rep. of Germany | 74/230.17 F |
| 1455865 | 6/1969 | Fed. Rep. of Germany | 74/230.17 A |
| 1816950 | 10/1970 | Fed. Rep. of Germany | |
| 1650895 | 9/1971 | Fed. Rep. of Germany | |
| 2118083 | 1/1973 | Fed. Rep. of Germany | 74/230.17 F |
| 2518496 | 5/1976 | Fed. Rep. of Germany | 74/230.17 F |
| 692864 | 3/1932 | France | 74/230.17 A |
| 572271 | 8/1958 | Italy | 74/230.17 A |
| 580240 | 9/1976 | Switzerland | |

OTHER PUBLICATIONS

Antriebstechnik, 5(1966), No. 1.

*Primary Examiner*—Leslie Braun
*Attorney, Agent, or Firm*—Craig & Antonelli

[57] ABSTRACT

An infinitely variable cone pulley transmission arrangement which includes a loop or belt arranged to revolve around pairs of pulley discs which define a symmetrical pulley wedge. Each pair of pulley discs is provided with pressure devices which act through an axially slidable pulley disc. The slidable pulley discs are arranged on different sides of the belt or loop. The respective pressure devices are arranged on the same first side of the loop or belt with the slidable pulley disc which is located on the other side of the loop or belt being operatively connected to the associated pressure devices by a servo member which runs axially through the adjacent fixed pulley disc.

5 Claims, 6 Drawing Figures

CONTINUOUSLY VARIABLE CONE PULLEY BELT-DRIVE GEARING

The present invention relates to a transmission arrangement and, more particularly, to an infinitely variable cone pulley drive transmission or gearing which includes a tractive means, formed as a loop or belt, revolving around pairs of cone pulleys which define symmetrical pulley wedges. One cone disc of each pair of cone pulleys is relatively axially fixed with the other cone disc of each pair being selectively axially slidable by way of a pressure means formed by a cylinder-piston unit.

In infinitely variable cone pulley arrangements, transmission ratios are changed by displacing the axially slidable cone discs relative to the associated fixed cone discs so as to affect the running plane of the tractive means. To always maintain the tractive means in a running plane at right angles to the shafts upon which the cone pulleys are mounted, when employing a symmetric conventional design of cone pulleys, the fixed cone discs must be arranged diagonally with respect to each other, that is, on different sides of the tractive means. Although an adjusting movement of the axially slidable cone disc to alter the transmission ratio will result in a lateral displacement of the tractive means, the tractive means will be maintained in a running plane normal to the shafts of the pulleys.

A drawback of the proposed infinitely variable cone pulley arrangements lies in the fact that the two pressure means for the respective cone pulley sets must also be located diagonally opposite each other, namely, next to the respective axially slidable cone discs. By virtue of this fact, one pressure means projects on the right side of the tractive means and the other pressure means projects on the left side of the tractive means. Since hydraulically-actuated cylinder-piston aggregates are generally utilized as the pressure means, a considerable lateral extension is required so that a relatively large installation space or housing is required.

To obtain a compact construction of cone pulley transmission arrangements, it has been proposed to place the two fixed discs of the respective pulley sets on the one side of the tractive means and the two slidable cone discs with their pressure means on the other side of the tractive means. However, due to the necessity of maintaining the running plane of the tractive means such as, for example, a belt, at right angles to the shafts upon which the cone pulleys are arranged, this proposed compact construction can be realized only with an asymmetric pulley cone. The two fixed cone discs must then be formed as flat discs, which gives rise to considerably higher specific surface pressures on the movable cone discs and about one-quarter of the efficiency is lost.

In Swiss Patent Specification No. 580,240, a gearing or driving aggregate with a symmetric pulley wedge is disclosed wherein the pressure means are arranged on the same side of the tractive means, but the slide cone disc on the driving side is moved mechanically by an adjusting device while the slidable cone disc on the output side adjusts itself correspondingly under a spring load. A disadvantage of this proposed driving aggregate resides in the fact that, for changing the transmission ratio, the slidable input cone disc, rigidly connected with a motor shaft, has to be moved together with the whole motor. As a result, the cost of construction and the space requirements are still higher than in the above-mentioned diagonal arrangement of the pressure means. Moreover, this proposed driving aggregate is unsuitable for use as a fixed installation.

In German Pat. No. 2,118,083 and U.S. Pat. No. 3,782,213, an infinitely variable transmission is provided wherein a stationary conical disc is connected rigidly with a shaft with a movable conical disc being axially slidable on the shaft, but connected thereto for rotation. A seal carrier is connected with a shaft and a cylinder with the movable conical pulley. At least two sets of discs are provided with pressure oil flowing through a shaft bore into a pressure space so that the movable pulley is forced against the tractive means. A small throttle opening is provided for permitting a leakage of the pressure medium to a second cylinder space which is subsequently filled with the pressure medium. The pressure medium is held in the second cylindricall space by rotation with excess oil escaping through a ring gap.

The aim underlying the present invention essentially resides in providing an improved infinitely variable cone pulley transmission or gearing which permits a substantially more compact construction, while maintaining a symmetric pulley wedge.

In accordance with one feature of the present invention, the pressure means for selectively displacing the axially displaceable cone disc of each pulley set is located on the same side of the tractive means, with one of the slidable cone discs lying on a first side of the tractive means and the other slidable cone disc lying on the other side of the tractive means. The slidable cone disc arranged on the other side of the tractive means is operatively connected in a mechanical way with the associated pressure means by way of one or more servo members which pass through the adjacent fixed disc.

One advantage of the construction in accordance with the present invention resides in the fact that the pressure means may be disposed on the same side of the tractive means and, in spite of such disposition of the pressure means, the transmission can operate with fixed discs that are arranged diagonally to each other and with a symmetric pulley wedge. For this purpose, the servo members for the cone disc lying on the other side of the tractive means are passed inside the associated fixed disc and articulated on the pressure means.

In accordance with another advantageous feature of the present invention, it is possible to pass or extend the servo members from the pressure means to the slidable cone disc located on the other side of the tractive means through the shaft seating the cone discs forming the pulley cone, either through a central bore or through a longitudinal groove. Advantageously, the servo members are provided with radially projecting followers for connecting the pressure means on one side of the tractive means to the slidable cone disc on the other side of the tractive means.

In the event there is relative rotary movement between the shaft and the cone discs, according to the present invention, the compressive forces can be introduced through axial bearings into the radially projecting followers of the servo members. Alternatively, the servo members may also run outside of the cone pulley shaft and may, for example, be formed by an extended hub of the slidable cone disc whereby it is passed through an adjacent fixed disc coaxially inside a bearing bush.

Advantageously, according to the present invention, the fixed disc may be secured in its axial position by a pin passing through an associated bearing bush and a shaft of the cone pulley, with the intervening bearing bush of the slidable cone disc having a transverse slot, thereby permitting the required axial play for the slidable cone disc. Alternatively, the fixed disc may be supported upon the cone pulley shaft, about the bearing of the shaft in a transmission housing, over a cylinder containing the pressure means.

The arrangement according to the present invention is especially suitable if the pressure means are of hydraulic nature and constructed as, for example, conventional cylinder-piston aggregates. The cylinder may then be joined to the fixed disc, and the servo piston contained therein and forming with the fixed disc a pressure chamber is connected to the servo members for the slidable cone disc. In such construction, the servo piston may advantageously be connected by an extended hub thereof to the slidable cone disc.

In accordance with yet further advantageous features of the present invention, a torque-dependent mechanical pressure means, of a conventional construction, may be provided between the servo piston and a bearing bush of the fixed disc with the servo piston being connected non-rotatably but axially slidably on a shaft of the cone pulley. A connection of such type may be effected through a holding flange with the servo piston being slidable relative to the holding flange in an axial direction and non-rotatably engaged with the flange by way of radial keys or serrations.

By virtue of the constructional features of the present invention, like parts may be employed on both cone pulley shafts where the pressure means is located on the same side of the tractive means as the slidable cone disc. It need only be ensured that the pressure means now acts upon the cone disc that is directly adjacent to it and the other cone disc is axially non-slidably guided.

Accordingly, it is an object of the present invention to provide a cone pulley transmission arrangement which avoids, by simple means, the shortcoming and drawbacks encountered in the prior art.

Another object of the present invention resides in providing a cone pulley transmission arrangement which achieves a high specific efficiency with the finishing technical expenses being maintainable within economically advantageous limits.

A further object of the present invention resides in providing a cone pulley transmission arrangement which functions reliably under all operating conditions.

An additional object of the present invention resides in providing a cone pulley transmission arrangement which ensures a precise transmission of forces throughout an entire transmission ratio range.

Yet another object of the present invention resides in providing a cone pulley transmission arrangement which permits a substantially compact construction, while nevertheless utilizing a symmetric pulley wedge.

These and other objects, features and advantages of the present invention will become more apparent from the following description when taken in connection with the accompanying drawings which show, for the purposes of illustration only, several embodiments in accordance with the present invention, and wherein.

Figure 1:
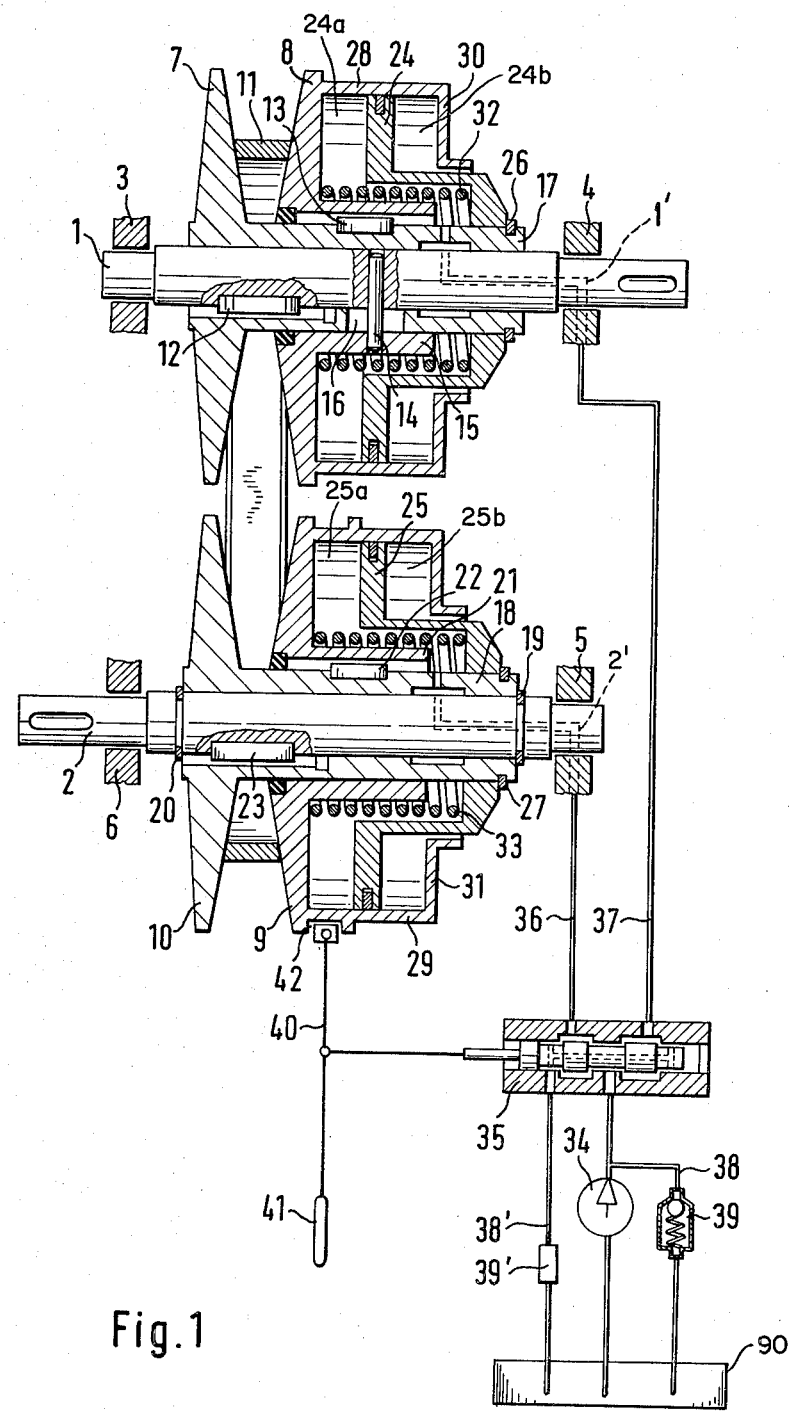
FIG. 1 is a partial schematic cross-sectional view of a first embodiment of an infinitely variable cone pulley transmission in accordance with the present invention.

Referring now to the drawings wherein like reference numerals are used throughout the various views to designate like parts and, more particularly, to FIG. 1, an infinitely variable cone pulley transmission arrangement with hydraulic pressure means is provided which includes shafts 1, 2 rotatably mounted on roller bearings (not shown) at respective bearing points 3, 4 and 5, 6 of a housing or casing not illustrated in detail. Pairs of friction or cone discs 7, 8 and 9, 10 are seated on the respective shafts 1, 2 with each pair of friction or cone discs defining a symmetrical pulley wedge. A tractive means 11 such as, for example, a belt or the like, revolves around the pulleys defined by the respective pairs of friction or cone discs 7, 8 and 9, 10.

The friction or cone disc 7 is axially slidable upon the shaft 1 and is guided in a non-rotatable manner relative to both the shaft 1 and the friction or cone disc 8 by fitting keys 12, 13. The friction or cone disc 8 is seated on an extended hub of the friction or cone disc 7, which hub is formed by a bearing bush or sleeve 17. The extended hub of the friction disc 7 is arranged outside of the shaft 1 and passes coaxially through a bearing bush or sleeve 15 of the friction disc 8 so that the extended hub formed by the bush or sleeve 17 functions as a servo member operatively connecting the pressure means disposed on one side of the tractive means 11 with the axially slidable friction or cone disc 7 disposed on the other side of the tractive means 11.

A transversely extending pin 14 is provided for rigidly connecting the friction disc 8 with the shaft 1. A slot 16 is provided in the bearing bush or sleeve 17, through which slot the transverse pin 14 extends so as to allow for axial mobility or selective axial displacement of the friction disc 7 by the pressure means. The slot 16 extends about or is positioned at a crossing point of the transverse pin 14 with the bearing bush or sleeve 17 so that the axially slidable friction or cone disc 7 may execute the desired axial adjusting movements.

The friction or cone disc 10 is provided with a bearing bush or sleeve 18. Rings 19, 20 abut end faces of the bearing bush or sleeve 18 and the friction or cone disc 10 so as to immovably fix the friction or cone disc 10 against axial movement with respect to the shaft 2. The friction or cone disc 9 is provided with a bearing bush or sleeve 21 and is axially slidable relative to the friction or cone disc 10 upon the bearing bush or sleeve 18. Fitting keys 22, 23 establish a connection between the two friction or cone discs 9, 10, as well as between the shaft 2 and the friction discs 9, 10.

A cylinder-piston aggregate is provided at both cone pulley sets defined by the pairs of friction or cone discs 7, 8 and 9, 10 with each cylinder-piston aggregate functioning as an adjusting pressure means. The cylinder-piston aggregates include servo pistons 24, 25 axially fixed upon the respective bearing bushes or sleeves 17, 18 by rings 26, 27, respectively. Cylinders 28, 29 are rigidly connected with the friction or cone discs 8, 9, respectively. The respective cylinders 28, 29 are provided with radially inwardly extending end walls or cover 30, 31 at a position facing away from the respective friction or cone discs 8, 9.

A cylinder space is formed between the respective friction or cone discs 8, 9 and associated servo pistons 24, 25. The respective cylinder spaces form pressure chambers 24a, 25a which receive and accommodate a pressure medium supplied from an appropriate pressure medium source. For this purpose, pressure medium conduits or bores 1', 2' are provided in the shafts 1, 2, respectively, for communicating the pressure medium source with the respective pressure medium chambers 24a, 25a. Cavities or chambers 24b, 25b are formed between the respective servo pistons 24, 25 and associated end walls 30, 31. Each cavity or chamber 24b, 25b serves as a pressure equalizing chamber for compensating centrifugal pressure in a conventional manner disclosed more fully in, for example, the afore-mentioned German Pat. No. 2,118,283 and U.S. Pat. No. 3,782,213.

Pressure springs 32, 33 are provided for exerting an initial or basic pressure on the tractive means 11 when the transmission arrangement is inactive. The pressure medium source supplies pressure medium to the respective cylinder-piston aggregates in a conventional manner with the pressure medium source including a common pump 34 and a control slide valve 35 for distributing the pressure medium between two ducts or pressure medium conduits 36, 37. Pressure medium such as, for example, oil or the like flows back into a pressure medium reservoir or container 90 through a duct or conduit 38' and a valve 39'. The valve 39' sets or determines the required pressure or urging force of the pressure means. Surplus pressure medium may drain away through a duct or pressure medium conduit 38 and an excess pressure valve 39. The pressure applied on an output side of the transmission is determined by an outflow throttle. The output pressure may be kept constant by, for example, the valve 39' or may be responsive to a load by the interposition of a torque measuring member. The input pressure of the transmission arrangement establishes itself automatically according to the balance of forces between the input and the output.

The control slide valve 35 is operatively connected to a servo lever 40. The servo lever 40 is articulated at one end thereof in a groove 42 on the cylinder 29 of the axially slidable friction or cone disc 9 and is adjustable on the other end thereof by a manual lever 41 of the transmission arrangement. As apparent, upon a predetermined positioning of the manual lever 41, the control slide valve 35 is positioned so as to supply pressure medium from the pressure medium source to the respective pressure chambers 24a and/or 25a, thereby positioning the axially slidable friction or cone discs 8 and/or 9 so as to provide the appropriate transmission ratio corresponding to the positioning of the manual lever 41.

As also apparent from FIG. 1, due to the direct connection of the friction or cone disc located on one side of the tractive means 11 to the pressure means provided on the other side of the tractive means 11, it is possible to have the pressure means act alternatively on the one or other friction or cone disc according to which of the two friction or cone discs is axially fixed to the shaft. Consequently, the pressure means can be placed one beneath the other in a space-saving manner.

Figure 2:
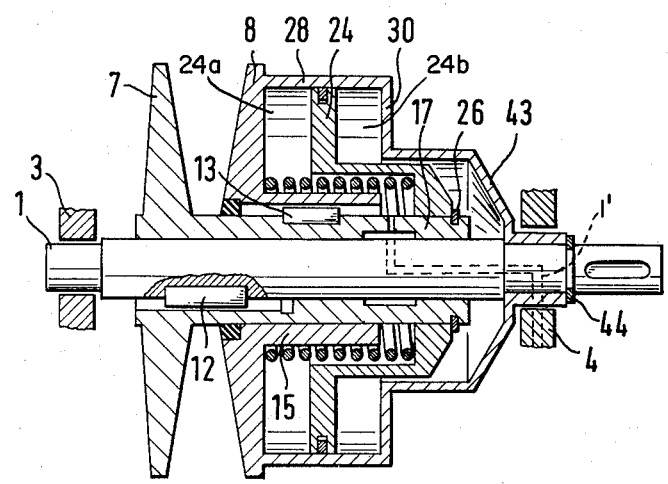
FIG. 2 is a cross-sectional view of an upper cone pulley of a further embodiment of an infinitely variable cone pulley transmission in accordance with the present invention.

FIG. 2 provides an example of an upper pulley set constructed of friction cones or discs substantially in the same manner as shown in FIG. 1. However, in the construction of FIG. 2, the axial support of the fixed cone or disc 8 is obtained by way of a conical extension connected to the end wall 30 rather than by means of a transverse pin 14. A ring 44 in the bearing 4 is provided for axially fixing the friction disc relative to the shaft 1.

Figure 3:
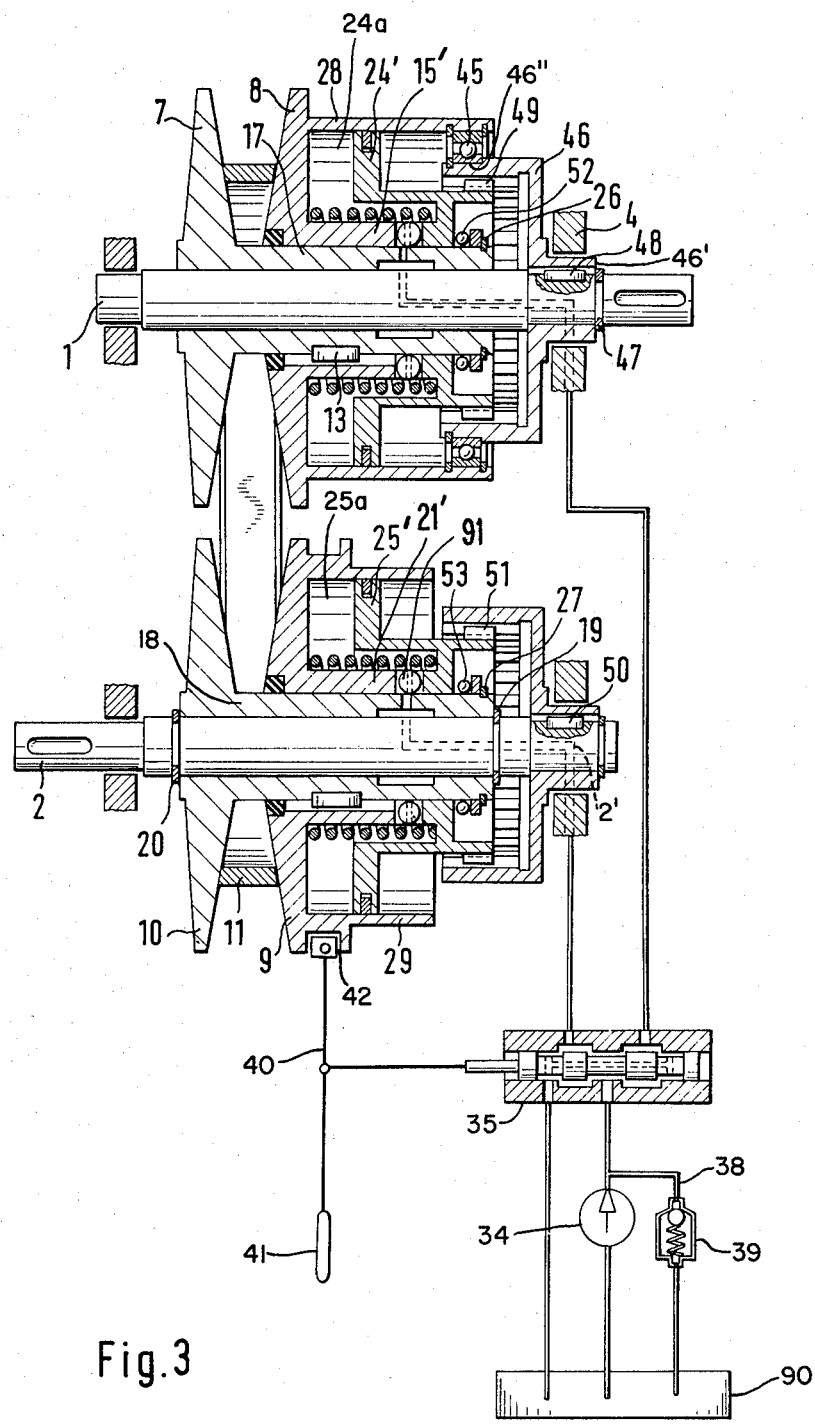
FIG. 3 is a partially schematic cross-sectional view of yet another embodiment of an infinitely variable cone pulley transmission in accordance with the present invention utilizing a mechanical hydraulic pressure means.

In the transmission arrangement according to FIG. 3, support of the axially slidable friction or cone discs 7, 9 is obtained hydraulically as well as mechanically. For this purpose, a rotary connection is provided between the shafts 1 and 2 and the two pairs of cone pulleys formed by the friction or cone discs 7, 8 and 9, 10. The rotary connection is formed in a convention manner for generating pressure between the friction or cone discs 7, 8 or 9, 10 and the tractive means 11 according to the torque. Each servo piston 24', 25' and bearing sleeve 15', 21' of the adjacent cone or friction disc have cam tracks on adjacent faces with balls 91 disposed between the cam tracks. When transmitting torque, such construction results in a known manner in axial forces, proportional to the torque, tending to separate the two parts.

In the upper pulley set of the construction of FIG. 3, where the cone disc 8 is formed as the fixed disc, the disc 8 is secured in an axial direction by a cylinder 28, ball bearing 45 and a retaining or holding flange 46 which is axially secured by a retaining ring 47 in the bearing 4.

In the construction of FIG. 3, the torque transmission from the shaft 1 to the cone pulley formed by the friction or cone disc 7, 8 is effected by an adjusting spring 48 disposed between the shaft 1 and a portion 46' of the retaining flange 46, as well as by radial keys or serrations 49 provided between another portion 46" of the retaining flange 46 and the servo piston 24'. As apparent, the fixed cone or disc 8 could be axially supported in some other suitable manner.

The lower pulley set of the arrangement of FIG. 3 is essentially the same as that of the upper pulley set, except that, in view of the necessary transposition of the fixed disc or cone 10 and the slidable cone or disc 9, the ball bearing 45 is eliminated and the friction or cone disc 10 is axially fixed to the shaft 2. Consequently, whereas in the upper pulley set, the pressure fluid between the servo piston 24' and the friction cone or disc 8 produces an axial displacement of the cone or disc 7, in the lower pulley set, the cone or disc 9 is axially displaced.

In order to improve the rotatability of the servo pistons 24', 25' relative to the bearing bushes or sleeves 17, 18, respectively, thrust bearings 52, 53 may be provided between end portions of the respective servo pistons 24', 25' and the retaining rings 26, 27 which secure the servo pistons 24', 25' in the axial direction.

Aside from the above-noted features, the function of the transmission arrangement and the control of the transmission ratio of the arrangement of FIG. 3 are as described in connection with the transmission arrangement of FIG. 1.

Figure 4:
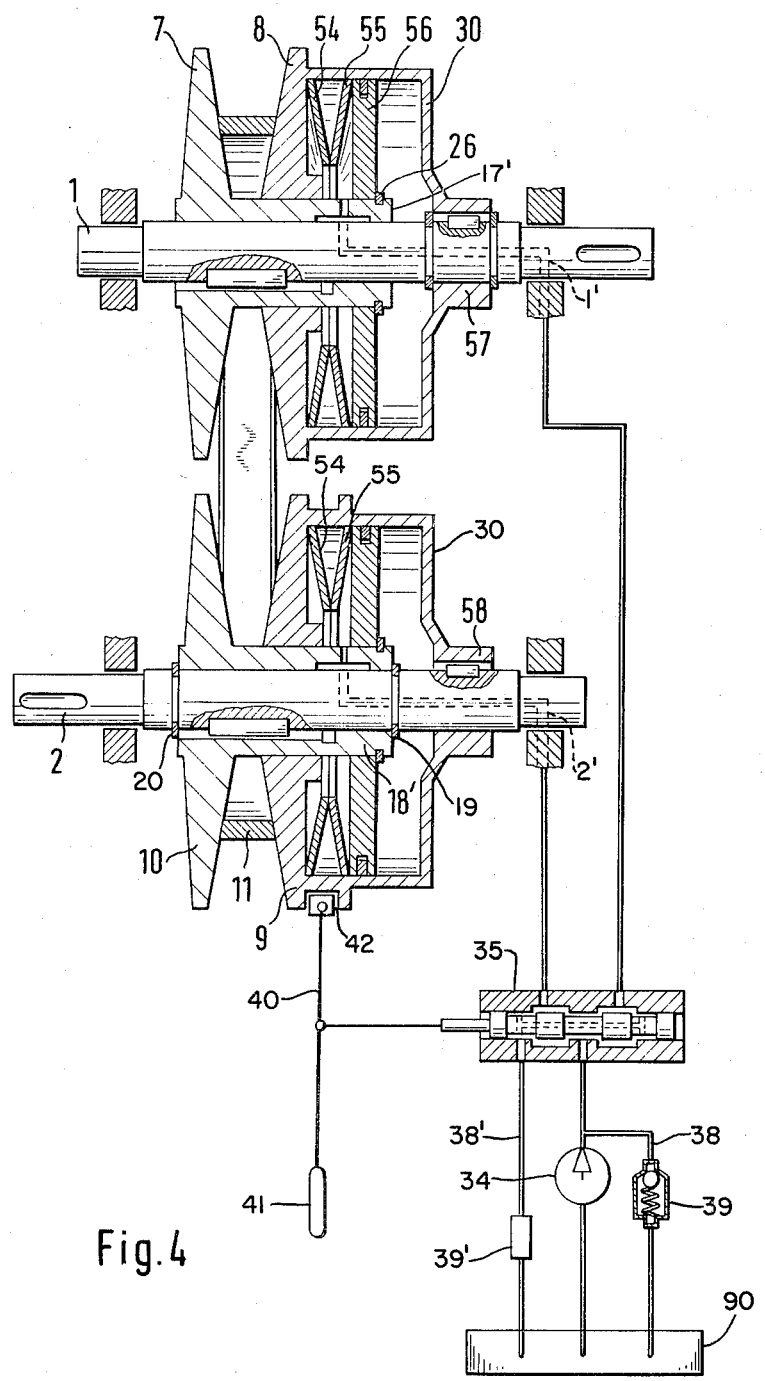
FIG. 4 is a partially schematic cross-sectional view of an infinitely variable cone pulley transmission similar to FIG. 1, but of a more compact construction.

According to FIG. 4, an infinitely variable cone pulley transmission arrangement is provided wherein the pulley sets have substantially the same construction as that illustrated in FIG. 2; however, the bearing bushes or sleeves 17', 18' of the two friction discs or cones 7, 10 are considerably shortened so that the transmission arrangement of FIG. 4 is marked by a particularly short axial length. The shortening of the bearing bushes or sleeves 17′, 18′ is made possible by, among other things, the fact that the pressure springs for the basic compression or initial pressure on the tractive means 11 are formed as plate springs and the servo pistons are formed as circular discs.

As shown in FIG. 4, in the upper pulley set, two plate springs 54, 55 are arranged so as to face each other with the respective springs being in contact with each other along their inner perimeter and bearing with their outer perimeter against the friction cone or disc 8 and the servo piston 56, respectively. The servo piston 56, formed as a circular disc, is axially fixed by the retaining ring 26 upon the bearing bush or sleeve 17′ of the axially shiftable friction cone or disc 7 in a manner more fully disclosed hereinabove. Axial support of the fixed cone or disc 8 is correspondingly effected in the manner illustrated in FIG. 2 by the cylinder end wall or cover 30 which runs out straight into a non-rotatable axially non-slidable bearing boss 57 provided on the shaft 1.

In the lower pulley set of the arrangement of FIG. 4, as with the upper pulley set, two plate springs 54, 55 face each other and are arranged so as to contact each other along their inner periphery and bear with their outer peripheral surfaces against the axially slidable friction cone or disc 9 and servo piston 56, respectively. The friction cone or disc 9 is non-rotatably but axially slidably connected at the bearing boss 58 with the shaft 2. Axial support for the fixed friction disc or cone 10 is effected in a manner similar to the arrangement of FIG. 1 by way of retaining rings 19, 20 which abut end faces of the bearing bush or sleeve 18′ and friction disc or cone 10.

The friction discs or cones 8, 9 may advantageously be rigidly connected to their associated pressure cylinders and the respective bearing bosses 57, 58 so as to provide for a stable bearing construction. Apart from the shorter structural length, the transmission arrangement of FIG. 4 also results in a considerable saving in cost since the individual conponents are simpler to manufacture.

Figure 5:
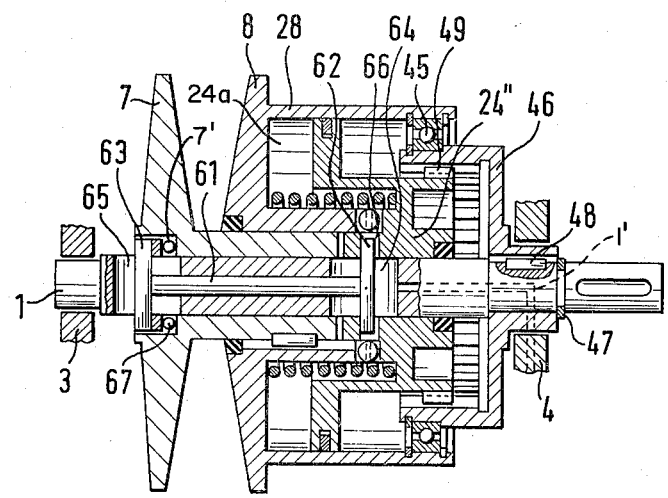
FIG. 5 is a cross-sectional view of a cone pulley similar to FIG. 3, but with servo members located inside of the cone pulley shaft.
Figure 6:
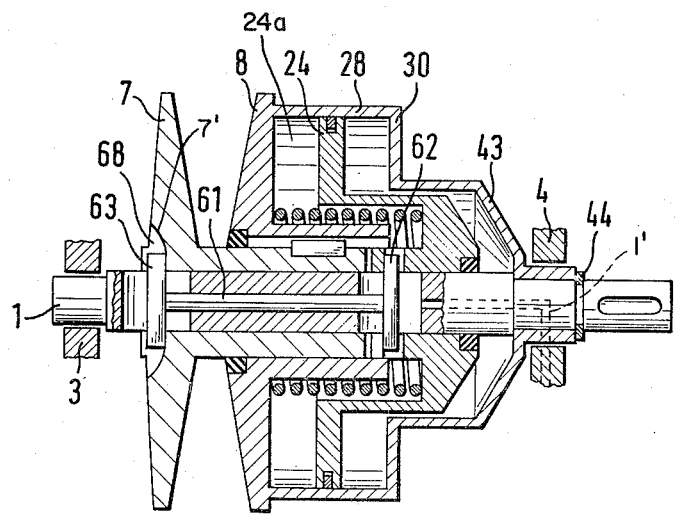
FIG. 6 is a cross-sectional view of a cone pulley in accordance with the present invention similar to that of FIG. 2, but with the servo members located in the cone pulley shaft.

The transmission arrangements of FIGS. 5 and 6 provide examples of pulley sets wherein the connection of the pressure means with the friction discs or cones located on the opposite side of the tractive means 11 is established by servo members which pass through the respective shafts upon which the cone pulley sets are mounted.

As shown in FIG. 5, a pulley set is constructed so that the pressure means is mechanical and hydraulic as, for example, in the construction of the upper pulley set of FIG. 3. The cone pulley shaft 1 includes a central bore in which is axially slidably accommodated a servo member in the form of a rod 61. Radially extending followers 62, 63 of, for example, rectangular cross-section, are fixed to both ends of the rod 61. One follower 62 provides a connection with the pressure means, namely, a servo piston 24″ with the other follower 63 providing a connection with the axially slidable cone or disc 7. In order to give both followers 62, 63 the necessary pay for altering the transmission ratio, the followers 62, 63 are mounted on the shaft 1 so as to be slidable in a respective longitudinally extending slot 64, 65.

The follower 62 rests with both its ends in corresponding recesses 66 in the servo piston 24″. The recesses 66 may also be used for supplying pressure medium to the cylinder or pressure medium space 24a between the servo piston 24″ and the friction cone or disc 8. The ends of the other follower 63 project into a recess 7′ in the axially slidable cone or disc 7 and are axially supported thereat through a thrust bearing 67 on the head surface of the recess 7′.

The pressure acting on the servo piston 24″ is thus transmitted through the follower 62, the rod 61 and the follower 63 to the slidable friction disc or cone 7. The object of the thrust bearing 67 is to facilitate the rotatability of the two friction cones or discs 7, 8 relative to the shaft 1 and thus that of the servo members revolving therewith. Such relative rotation results whenever the torque to be transmitted by the torque-responsive pressure means changes.

While not illustrated in the drawings for the purpose of simplification, for technical reasons, the shaft 1 may be composed of several interconnected parts.

FIG. 6 provides an example of the application of the same principles to the arrangement of the servo members in the example of a purely hydraulic pressure means such as illustrated in FIG. 2. For this purpose, the follower 63 is anchored in a radial groove 68 of the slidable friction cone or disc 7. By virtue of such anchoring, the torque passes from the shaft 1 through the follower 63 to the friction cone or disc 7 and the friction cone or disc 8 which is non-rotatably united with it, whereby the adjusting spring 12, such as employed in the construction of FIG. 2, is unnecessary.

While I have shown and described several embodiments in accordance with the present invention, it is understood that the same is not limited thereto, but is susceptible of numerous changes and modifications as known to those skilled in the art to which it pertains, and I therefor do not wish to be restricted to the details shown and described hereinabove, but intend to cover all such changes and modifications as are encompassed by the scope of the appended claims.

I claim:

1. An infinitely variable cone pulley belt-drive transmission arrangement with a tractive means arranged to revolve around first and second pairs of cone discs having a symmetric pulley wedge, wherein each disc pair has a common shaft and comprises a first cone disc with an extended hub and a second cone disc carried on the extended hub, and wherein on one side of the tractive means there is a pressure means for each disc pair, each pressure means comprising a cylinder and a piston, the cylinder being secured to the respective second cone disc and radially supported on the respective shaft by way of cover means provided on the cylinder and the piston being secured to the hub of the respective first disc, the fist disc of one disc pair being axially slidable on its shaft and the second disc of the said one disc pair being axially fixed to the shaft by its associated cylinder and the first disc of the other disc pair being axially fixed by its hub to its shaft and the second disc of the other disc pair being carried on the shaft in an axially slidable manner by way of its associated cylinder cover means.

2. A gearing according to claim 1, wherein each cylinder is radially supported on the respective shaft by a bearing boss connected to the cylinder cover means.

3. A gearing according to claim 2, wherein means are provided to prevent the rotation of each bearing boss relative to the shaft.

4. A gearing according to any of claims 1, 2 or 3, wherein each piston is formed as a circular disc.

5. A gearing according to claim 4, wherein each piston is resiliently biased by pressure springs formed as plate springs disposed between the piston and the second cone disc.

* * * * *